United States Patent
Bohm et al.

[11] 4,110,005
[45] Aug. 29, 1978

[54] WIDE-ANGLE ATTACHMENT FOR VARIFOCAL OBJECTIVE

[75] Inventors: Kurt Böhm, Vienna; Leopold Rollenitz, Totzenbach, both of Austria; Francois Laurent, Yverdon, Switzerland

[73] Assignee: Bolex International SA, Ste-Croix, Switzerland

[21] Appl. No.: 711,835

[22] Filed: Aug. 5, 1976

[30] Foreign Application Priority Data

Aug. 6, 1975 [AT] Austria .................................. 6079/75

[51] Int. Cl.² ...................... G02B 15/18; G02B 7/02
[52] U.S. Cl. ................................. 350/184; 350/187; 350/257; 354/295
[58] Field of Search .............. 350/257, 187, 184, 186; 354/295, 296

[56] References Cited

U.S. PATENT DOCUMENTS 2,559,844  7/1951  Bennett ............................ 350/202
3,891,304  6/1975  Muszumanski et al. .......... 350/184
3,997,245  12/1976  Uesugi ............................. 350/187

FOREIGN PATENT DOCUMENTS 222,346  1959  Australia ........................... 350/257

*Primary Examiner*—Conrad J. Clark
*Attorney, Agent, or Firm*—Montague & Ross

[57] ABSTRACT

A varifocal object selectively focusable upon a normal range of object distances and a substantially shorter macro range can be supplemented by a negative component of one or more lenses whose focal length is less than the depth of the macro range and which forms a virtual image of a nearby object on the object plane of the objective when the latter is adjusted to a predetermined closeup position. A correlating linkage between a seat for the supplemental component and a control member designed to establish the closeup position serves to index the control member in that position or to prevent the emplacement of the supplemental component if the objective is in a different position.

8 Claims, 11 Drawing Figures

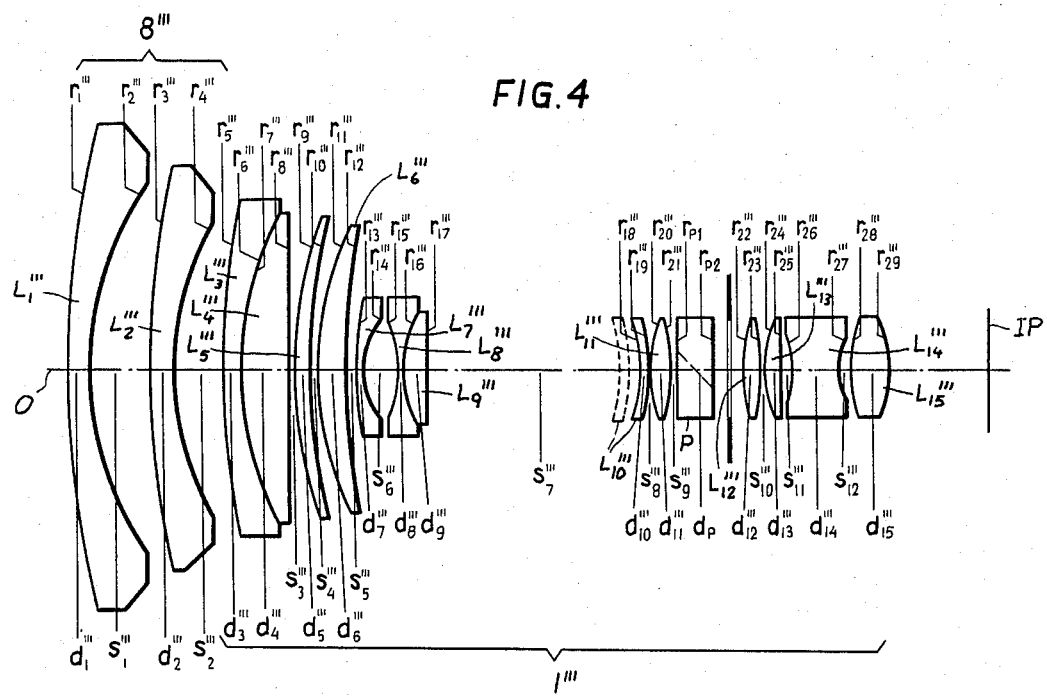
FIG. 4
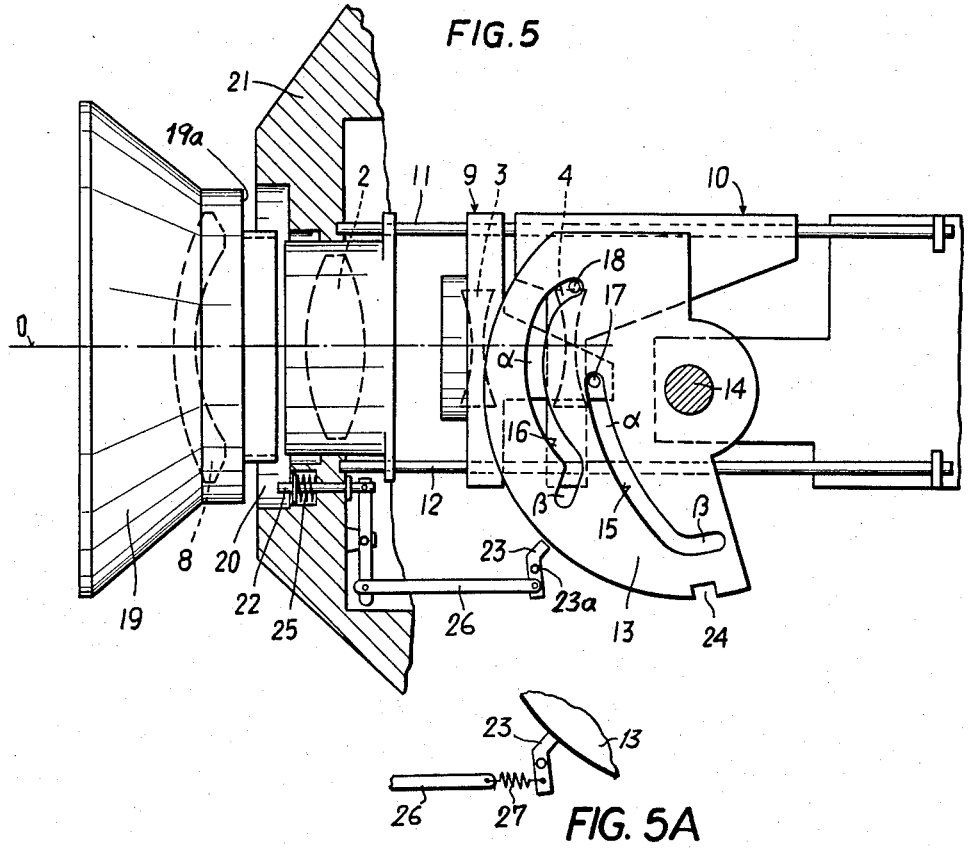
FIG. 5
FIG. 5A

WIDE-ANGLE ATTACHMENT FOR VARIFOCAL OBJECTIVE

FIELD OF THE INVENTION

Our present invention relates to an optical system of the varifocal type for a camera or other instruments such as microscopes or photographic copiers.

BACKGROUND OF THE INVENTION

In an objective of the pancratic type, more often referred to as a varifocal or zoom objective, it is known to provide two axially shiftable components, usually preceded by a stationary front component, whose displacement changes the overall focal length of the system while holding its image plane constant. Within a normal zoom range, the object plane lies at infinity or at a lesser distance that may be chosen by slightly displacing, for example, all or part of the stationary front component. This normal range is limited at one end by a telephoto position, in which the overall focal length has its maximum value $f_{max}$, and at the other end by a wide-angle position, the overall focal length then having a minimum value $f_{min}$.

As has been shown in U.S. Pat. No. 3,773,402, it is possible to reduce the effective focal length beyond that limiting value by a further shifting of one or both of the two axially movable components with concurrent displacement of the object plane, correlated with the stationary image plane, toward the objective. This enables the taking of closeup pictures of wide-angle format within the macro range which may be defined as one giving image scales between 1:10 and 1:1. Reference in this connection may also be made to U.S. Pat. No. 3,891,304. The transition from the normal range to the macro range is generally characterized by a reversal of the relative shift of the two movable components.

Alternatively, a foreshortening of the overall focal length with concurrent reduction in object distance can also be achieved — abeit less conveniently — by moving a normally withdrawn additional lens member into the path of the light rays within the varifocal objective.

In practice, conventional objectives of this type have overall focal lengths whose lower limit $f_{min}$ in the normal range is not less than about 7 mm. This restricts the extent to which a camera so equipped can be used by, for example, an amateur photographer interested in taking indoor pictures.

OBJECTS OF THE INVENTION

The general object of our invention is to provide simple means in an optical system of the type discussed for allowing selective reduction of the effective focal length to a value enabling the taking of pictures of very wide angle at close range.

A more particular object is to provide an objective of this kind whose effective minimum focal length can be as low as 3 mm or less.

SUMMARY OF THE INVENTION

We realize these objects, in accordance with our present invention, by providing supplemental lens means of negative refractivity selectively insertable between the varifocal objective and an object to be imaged on a wide-angle scale, the supplemental lens means having a focal length which is less than the depth of the macro range. The varifocal objective includes movable lens means displaceable by a control member in order to shift the object plane from a normal range to a substantially shorter closeup or macro range, as defined above. A sensor responsive to the position of the supplemental and/or the movable lens means serves to correlate the establishment of a working position for the supplemental lens means with a displacement of the movable lens means into a predetermined focusing position in which the object plane lies at a distance from the objective at which virtual images of objects within the closeup range can be formed by the supplemental lens means.

The term "depth of the closeup (or macro) range" can be defined as the distance between the limit of that range proximal to the normal range and the varifocal objective itself, more particularly its object-side principal point.

The supplemental lens means may be an attachment consisting of one or more air-spaced lens members of negative refractivity, preferably meniscus-shaped with forwardly facing convex surfaces. Two or more lens members of this nature, preferably of similar optical parameters, could be used individually or jointly to provide different wide-angle effects.

Such a component will form a reduced, virtual, intermediate image of an object in a plane lying between itself and its own front-focal point. If that virtual-image plane coincides — within the focal-depth limits of the objective — with the object plane selected by adjustment of the control member, the object will be sharply reproduced on the fixed image plane of the varifocal system.

In the simplest case, the sensor may be a visual indicator operatively coupled with the movable lens means for alerting the user to the fact that the object plane has been shifted into the desired position within the macro range. Such an operative coupling need not include a physical connection but may be effected optically, as by light rays traversing the movable lenses and reaching a viewfinder equipped with a conventional focus indicator such as an image-splitting viewer or a ground-glass plate.

In a more sophisticated system, pursuant to another feature of our invention, the sensor forms part of a correlating linkage between a seat for the supplemental component and the control member used for adjusting the varifocal objective to the macro range. Such a linkage may either index the control member in the predetermined focusing position or prevent the emplacement of the wide-angle attachment in its seat as long as that focusing position is not established.

BRIEF DESCRIPTION OF THE DRAWING

The above and other features of our invention will now be described in detail with reference to the accompanying drawing in which:

FIGS. 2, 3 and 4 are detail views of the components of the system of FIG. 1 according to three different embodiments;

FIG. 5 is a fragmentary side view, partly in axial section, of a lens mounting for a system according to our invention provided with a position sensor;

FIG. 5A is a detail view relating to a modification of the position sensor of FIG. 5;

SPECIFIC DESCRIPTION

Figure 1:
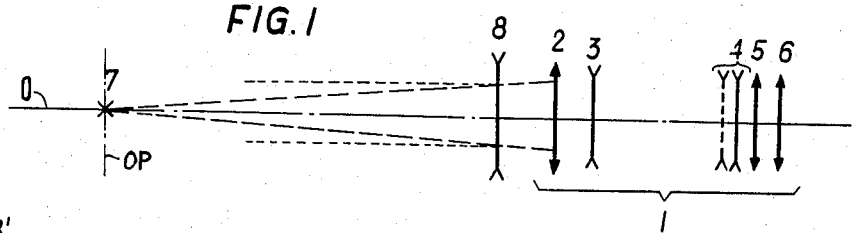
FIG. 1 diagrammatically shows the layout of an optical system embodying our invention.

In FIG. 1 we have represented by thin-lens symbols the several components of a conventional varifocal objective 1 along with a supplemental component or front attachment B. Objective 1 comprises a fixed positive front component 2, two axially movable negative components 3, 4, another axially fixed positive component 5 and a positive rear lens group 6 separated from components 2–5 by a diaphragm space. Components 3 and 4 are simultaneously shiftable along optical axis O, at different rates and/or in different directions, to vary the overall focal length of objective 1 with maintenance of a constant image plane (indicated at IP in FIG. 4) as is well known per se. At the wide-angle end of the normal varifocal range, component 4 can be further displaced from its full-line position to its dotted-line position for the purpose of establishing an object plane OP in the macro range intersecting the axis O at a point 7, e.g. as described in the two above-identified U.S. patents.

Attachment 8 does not form part of the varifocal objective but can be selectively positioned in front thereof, pursuant to our present invention, for the purpose of increasing the angle of view in the macro range. The focal length of this attachment is less than the depth of the macro range as discussed above, its front-focal point preferably lying near the point 7 on axis O. With objective 1 focused upon plane OP, by a suitable positioning of component 4, a virtual image of a nearby object to be photographed is formed by attachment 8 in that plane whence the incident rays strike the front component 2 of objective 1 at angles giving a wide field of view.

Figure 2:
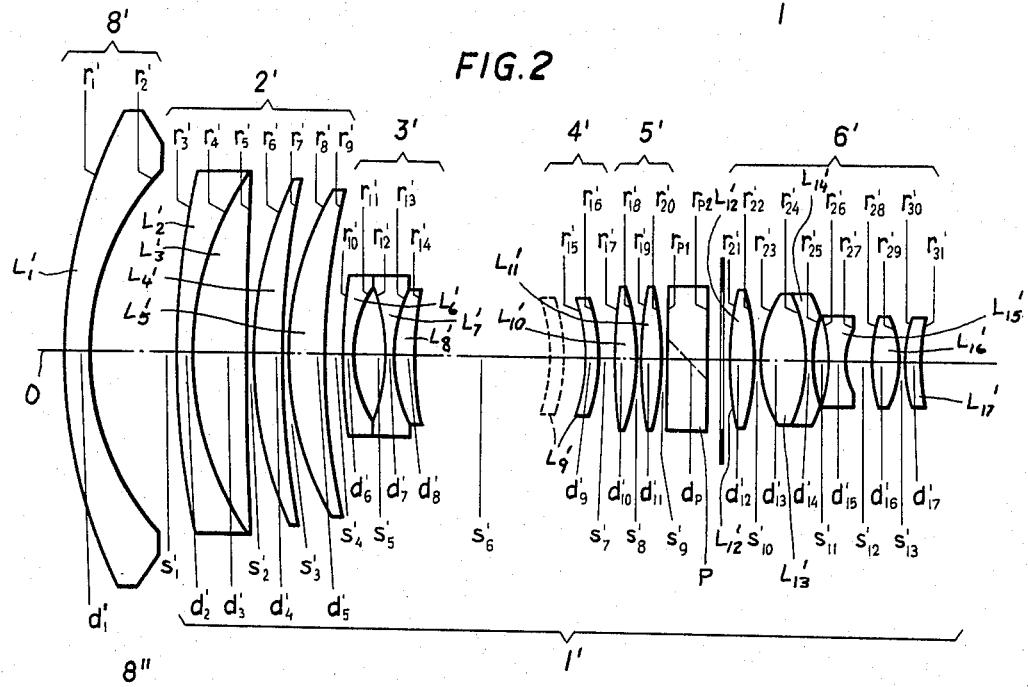
Figure 3:
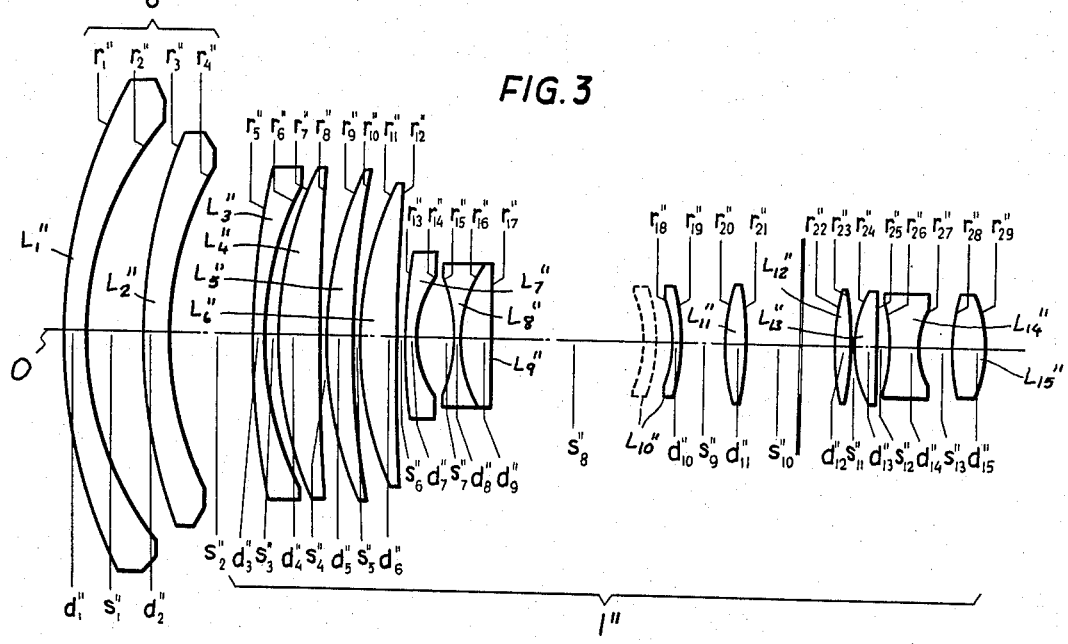

In FIGS. 2–4 we have shown representative embodiments of the system of FIG. 1 including varifocal objectives 1', 1'', 1''' and attachments 8', 8'', 8'''. It should be understood, however, that these attachments may be interchanged among the illustrated systems and that they could also be used with other varifocal objectives known per se, e.g. as given hereinafter with reference to Table D.

In FIG. 2 the attachment 8' is a single negative meniscus $L_1'$. The positive first component 2' of objective 1' consists of a compound lens member $L_2'$, $L_3'$ and two further lenses $L_4'$ and $L_5'$ air-spaced therefrom. The axially shiftable negative second component 3' consists of a singlet $L_6'$ and a doublet $L_7'$, $L_8'$. The axially shiftable negative third component 4' is a single negative meniscus $L_9'$. The fixed positive fifth component 5' consists of two biconvex lenses $L_{10}'$ and $L_{11}'$. A reflex prism P and a diaphragm separate this latter component from the fixed-focus rear lens group 6' consisting of a positive singlet $L_{12}'$, a positive doublet $L_{13}'$, $L_{14}'$, a negative singlet $L_{15}'$ and two positive singlets $L_{16}'$ and $L_{17}'$.

Illustrative numerical values for the radii of curvature $r_1'$–$r_{31}'$ and axial thicknesses $d_1'$–$d_{17}'$ of all these lenses, their axial separations $s_1'$–$s_{13}'$, their refractive indices $n_d$ and their Abbé numbers $\nu_d$ are given in the following Table:

TABLE A

| | | | $n_d$ | $\nu_d$ |
|---|---|---|---|---|
| $L_1'$ | $r_1' = +2.33$ $r_2' = 1.14$ | $d_1' = 0.12$ | 1.805 | 25.4 |
| | | $s_1' = 0.34$ | | |
| $L_2'$ | $r_3' = +9.929$ | $d_2' = 0.10$ | 1.805 | 25.4 |
| $L_3'$ | $r_4' = +2.044$ $r_5' = \infty$ | $d_3' = 0.38$ | 1.606 | 43.9 |
| | | $s_2' = 0.01$ | | |
| $L_4'$ | $r_6' = +2.482$ $r_7' = +7.189$ | $d_4' = 0.21$ | 1.620 | 60.3 |
| | | $s_3' = 0.01$ | | |
| $L_5'$ | $r_8' = +1.947$ $r_9' = +8.453$ | $d_5' = 0.28$ | 1.691 | 54.7 |
| | | $s_4' = \begin{cases} 0.038\ f_{min} \\ 0.763\ f_{med} \\ 1.097\ f_{max} \end{cases}$ | | |
| $L_6'$ | $r_{10}' = +6.210$ $r_{11}' = +0.629$ | $d_6' = 0.05$ | 1.691 | 54.7 |
| | | $s_5' = 0.21$ | | |
| $L_7'$ | $r_{12}' = -1.112$ $r_{13}' = +0.888$ | $d_7' = 0.05$ | 1.620 | 60.3 |
| $L_8'$ | $r_{14}' = +5.048$ | $d_8' = 0.14$ | 1.805 | 25.4 |
| | | $s_6' = \begin{cases} 1.204\ f_{min} \\ 0.368\ f_{med} \\ 0.145\ f_{max} \end{cases}$ | | |
| $L_9'$ | $r_{15}' = -0.782$ $r_{16}' = -1.899$ | $d_9' = 0.05$ | 1.744 | 44.8 |
| | | $s_7' = \begin{cases} 0.024\ f_{min} \\ 0.135\ f_{med} \\ 0.024\ f_{max} \end{cases}$ | | |
| $L_{10}'$ | $r_{17}' = \infty$ $r_{18}' = -1.131$ | $d_{10}' = 0.14$ | 1.620 | 60.3 |
| | | $s_8' = 0.01$ | | |
| $L_{11}'$ | $r_{19}' = +2.659$ $r_{20}' = -4.235$ | $d_{11}' = 0.12$ | 1.620 | 60.3 |
| | | $s_9' = 0.04$ | | |
| P | $r_{p1} = \infty$ $r_{p2} = \infty$ | $d_p = 0.25$ | 1.517 | 64.2 |
| | diaphragm space 0.09 + 0.05 | | | |
| $L_{12}'$ | $r_{21}' = +3.948$ $r_{22}' = -2.475$ | $d_{12}' = 0.16$ | 1.720 | 50.4 |
| | | $s_{10}' = 0.01$ | | |
| $L_{13}'$ | $r_{23}' = +0.676$ $r_{24}' = -0.835$ | $d_{13}' = 0.30$ | 1.664 | 35.8 |
| $L_{14}'$ | $r_{25}' = +2.399$ | $d_{14}' = 0.05$ | 1.805 | 25.4 |
| | | $s_{11}' = 0.07$ | | |
| $L_{15}'$ | $r_{26}' = -1.295$ $r_{27}' = +0.522$ | $d_{15}' = 0.11$ | 1.847 | 23.8 |
| | | $s_{12}' = 0.19$ | | |
| $L_{16}'$ | $r_{28}' = +2.482$ $r_{29}' = -0.576$ | $d_{16}' = 0.17$ | 1.713 | 53.8 |
| | | $s_{13}' = 0.01$ | | |
| $L_{17}'$ | $r_{30}' = +0.700$ $r_{31}' = +1.440$ | $d_{17}' = 0.12$ | 1.641 | 60.1 |

The numerical values for the radii, axial thicknesses, separations and focal lengths in the foregoing and following tables are based upon a value of unity for the median overall focal length $f_{med}$ of the varifocal objective 1' without the attachment 8'. The focal lengths $f_{max}$ and $f_{min}$ have the numerical values 1.91 and 0.40, respectively. Thus, the objective has a varifocal ratio of almost 5:1; its relative aperture is 1:1.2.

The combination of varifocal objective 1' and attachment 8' in the macro-range focusing position has an overall focal length of 0.22 and an image angle of 90°.

The prism P, of thickness $d_p$ and with planar faces $r_{p1}$, $r_{p2}$, deflects some of the incident rays to a nonillustrated viewfinder which may serve as a position sensor for the focusing lens $L_9'$ in the macro range, as mentioned above.

In the embodiment of FIG. 3 the attachment 8″ is shown to comprise two air-spaced negative menisci $L_1″$ and $L_2″$ with identical front radii $r_1″$, $r_3″$ and with identical rear radii $r_2″$, $r_4″$; the axial thicknesses and other parameters of these two lenses are also the same, as will be apparent from the illustrative numerical values given below. These two lenses are advantageously mounted for individual interposition in the path of incident rays so that either one or both of these lenses can be utilized to provide different field angles and magnification ratios.

The several components of objective 1″ are generally similar to those of objective 1′ (FIG. 2), except that lenses $L_3″$, $L_4″$ of the front member are air-spaced rather than cemented, the fourth component consists only of one positive lens $L_{11}″$, the second member of the rear group is a singlet $L_{13}″$ and the weakly refractive final positive lens $L_{17}'$ has been omitted. A prism P, not shown in FIG. 3, could of course also be inserted into the diaphragm space of objective 1″.

The magnitudes of the radii $r_1″-r_{29}″$, thicknesses $d_1″-d_{15}″$ and separations $s_1″-s_{13}″$ of lenses $L_1-L_{15}″$, are refractive indices $n_d$ and their Abbe numbers $\nu_d$ are listed in the following Table:

TABLE B

| Lens | Radii | Thickness/Separation | $n_d$ | $\nu_d$ |
|---|---|---|---|---|
| $L_1″$ | $r_1″ = +2.14$ | $d_1″ = 0.13$ | 1.805 | 25.4 |
|  | $r_2″ = +1.47$ |  |  |  |
|  |  | $s_1″ = 0.26$ |  |  |
| $L_2″$ | $r_3″ = +2.14$ | $d_2″ = 0.13$ | 1.805 | 25.4 |
|  | $r_4″ = +1.47$ |  |  |  |
|  |  | $s_2″ = 0.36$ |  |  |
| $L_3″$ | $r_5″ = +6.308$ | $d_3″ = 0.07$ | 1.805 | 25.4 |
|  | $r_6″ = +1.976$ |  |  |  |
|  |  | $s_3″ = 0.06$ |  |  |
| $L_4″$ | $r_7″ = +2.082$ | $d_4″ = 0.26$ | 1.620 | 60.3 |
|  | $r_8″ = \infty$ |  |  |  |
|  |  | $s_4″ = 0.01$ |  |  |
| $L_5″$ | $r_9″ = +2.341$ | $d_5″ = 0.15$ | 1.623 | 58.1 |
|  | $r_{10}″ = +4.961$ |  |  |  |
|  |  | $s_5″ = 0.01$ |  |  |
| $L_6″$ | $r_{11}″ = +1.805$ | $d_6″ = 0.22$ | 1.623 | 58.1 |
|  | $r_{12}″ = +12.664$ |  |  |  |
|  |  | $s_6″ = \begin{cases} 0.04\ f_{min} \\ 0.69\ f_{med} \\ 1.03\ f_{max} \end{cases}$ |  |  |
| $L_7″$ | $r_{13}″ = +5.981$ | $d_7″ = 0.05$ | 1.658 | 50.9 |
|  | $r_{14}″ = +0.567$ |  |  |  |
|  |  | $s_7″ = 0.16$ |  |  |
| $L_8″$ | $r_{15}″ = -1.086$ | $d_8″ = 0.05$ | 1.669 | 57.4 |
| $L_9″$ | $r_{16}″ = +0.652$ | $d_9″ = 0.15$ | 1.805 | 25.4 |
|  | $r_{17}″ = +7.039$ |  |  |  |
|  |  | $s_8″ = \begin{cases} 1.09\ f_{min} \\ 0.32\ f_{med} \\ 0.14\ f_{max} \end{cases}$ |  |  |
| $L_{10}″$ | $r_{18}″ = -0.639$ | $d_{10}″ = 0.05$ | 1.624 | 47.0 |
|  | $r_{19}″ = -1.288$ |  |  |  |
|  |  | $s_9″ = \begin{cases} 0.10\ f_{min} \\ 0.22\ f_{med} \\ 0.06\ f_{max} \end{cases}$ |  |  |
| $L_{11}″$ | $r_{20}″ = +1.097$ | $d_{11}″ = 0.10$ | 1.691 | 54.7 |
|  | $r_{21}″ = -3.661$ |  |  |  |
|  |  | $s_{10}″ = 0.46$ |  |  |
| $L_{12}″$ | $r_{22}″ = +2.052$ | $d_{12}″ = 0.10$ | 1.620 | 60.3 |
|  | $r_{23}″ = -2.052$ |  |  |  |
|  |  | $s_{11}″ = 0.01$ |  |  |
| $L_{13}″$ | $r_{24}″ = +0.686$ | $d_{13}″ = 0.13$ | 1.717 | 48.0 |
|  | $r_{25}″ = +26.527$ |  |  |  |
|  |  | $s_{12}″ = 0.04$ |  |  |
| $L_{14}″$ | $r_{26}″ = -0.848$ | $d_{14}″ = 0.16$ | 1.785 | 26.1 |
|  | $r_{27}″ = +0.535$ |  |  |  |
|  |  | $s_{13}″ = 0.18$ |  |  |
| $L_{15}″$ | $r_{28}″ = +1.614$ | $d_{15}″ = 0.19$ | 1.720 | 50.4 |
|  | $r_{29}″ = -0.639$ |  |  |  |

Attachment 8″ has an individual focal length of 3.11. The overall focal length of objective 1″ (without the attachment) varies between values $f_{max} = 2.03$
$f_{med} = 1$
$f_{min} = 0.43$.

This corresponds again to a varifocal ratio of nearly 5:1; the relative aperture is 1:1.9. The objective 1″ has the advantage of small loss of luminosity toward the image periphery as compared with similar objectives of the prior art.

The combined system 1″ + 8″ again has an overall focal length of 0.22 in the macro-range focusing position and an image angle of 90°.

The wide-angle attachment 8‴ of FIG. 4 consists also of two optically identical negative menisci $L_1‴$, $L_2‴$ which could be used individually or in combination. The objective 1‴ has a compound front member $L_3‴$, $L_4‴$ and is otherwise similar to objective 1″ of FIG. 3.

Illustrative numerical values for the parameters $r_1‴ - r_{29}‴$, $d_1‴ - d_{15}‴$, $s_1‴ - s_{12}‴$, $n_d$ and $v_d$ of its lenses $L_1‴ - L_{15}‴$ are listed in the following Table:

TABLE C

| | | | | $n_d$ | $v_d$ |
|---|---|---|---|---|---|
| $L_1‴$ | $r_1‴ = + 5.64$ | | $d_1‴ = 0.10$ | 1.805 | 25.4 |
| | $r_2‴ = + 1.35$ | $s_1‴ = 0.29$ | | | |
| $L_2‴$ | $r_3‴ = + 5.64$ | | $d_2‴ = 0.10$ | 1.805 | 25.4 |
| | $r_4‴ = + 1.35$ | $s_2‴ = 0.21$ | | | |
| $L_3‴$ | $r_5‴ = + 5.279$ | | $d_3‴ = 0.084$ | 1.805 | 25.4 |
| | $r_6‴ = + 1.670$ | | | | |
| $L_4‴$ | $r_7‴ = + 1.670$ | | $d_4‴ = 0.276$ | 1.620 | 60.3 |
| | $r_8‴ = \infty$ | $s_3‴ = 0.004$ | | | |
| $L_5‴$ | $r_9‴ = + 2.339$ | | $d_5‴ = 0.100$ | 1.658 | 50.9 |
| | $r_{10}‴ = + 4.191$ | $s_4‴ = 0.004$ | | | |
| $L_6‴$ | $r_{11}‴ = + 1.583$ | | $d_6‴ = 0.221$ | 1.658 | 50.9 |
| | $r_{12}‴ = + 7.391$ | $s_5‴ = \begin{cases} 0.029\ f_{min} \\ 0.821\ f_{med} \\ 1.112\ f_{max} \end{cases}$ | | | |
| $L_7‴$ | $r_{13}‴ = + 5.201$ | | $d_7‴ = 0.038$ | 1.691 | 54.7 |
| | $r_{14}‴ = + 0.459$ | $s_6‴ = 0.153$ | | | |
| $L_8‴$ | $r_{15}‴ = - 0.877$ | | $d_8‴ = 0.038$ | 1.669 | 57.4 |
| | $r_{16}‴ = + 0.639$ | | | | |
| $L_9‴$ | $r_{17}‴ = + 7.187$ | | $d_9‴ = 0.113$ | 1.805 | 25.4 |
| | | $s_7‴ = \begin{cases} 1.198\ f_{min} \\ 0.249\ f_{med} \\ 0.114\ f_{max} \end{cases}$ | | | |
| $L_{10}‴$ | $r_{18}‴ = - 0.576$ | | $d_{10}‴ = 0.042$ | 1.624 | 47.0 |
| | $r_{19}‴ = - 1.459$ | $s_8‴ = \begin{cases} 0.016\ f_{min} \\ 0.172\ f_{med} \\ 0.016\ f_{max} \end{cases}$ | | | |
| $L_{11}‴$ | $r_{20}‴ = + 1.055$ | | $d_{11}‴ = 0.102$ | 1.689 | 49.5 |
| | $r_{21}‴ = - 1.682$ | $s_9‴ = 0.038$ | | | |
| P | $r_{p1} = \infty$ | | $d_p = 0.209$ | 1.517 | 64.2 |
| | $r_{p2} = \infty$ | | | | |
| $L_{12}‴$ | $r_{22}‴ = + 1.785$ | | $d_{12}‴ = 0.088$ | 1.620 | 60.3 |
| | $r_{23}‴ = - 1.785$ | $s_{10}‴ = 0.004$ | | | |
| $L_{13}‴$ | $r_{24}‴ = + 0.614$ | | $d_{13}‴ = 0.109$ | 1.717 | 48.0 |
| | $r_{25}‴ = +15.718$ | $s_{11}‴ = 0.031$ | | | |
| $L_{14}‴$ | $r_{26}‴ = 0.826$ | | $d_{14}‴ = 0.251$ | 1.785 | 26.1 |
| | $r_{27}‴ = + 0.468$ | $s_{12}‴ = 0.107$ | | | |
| $L_{15}‴$ | $r_{28}‴ = + 0.967$ | | $d_{15}‴ = 0.163$ | 1.720 | 50.4 |
| | $r_{29}‴ = - 0.618$ | | | | | diaphragm space = 0.034 + 0.104

The overall focal length of objective 1‴ (without attachment 8‴) varies as follows:
$f_{max} = 2.219$
$f_{med} = 1$
$f_{min} = 0.299$.

This corresponds to a varifocal ratio of nearly 8:1. The objective has a relative aperture of 1:1.8. In combination with attachment 8‴, whose individual focal length measures 1.033, it has an image angle of approximately 180° so as to give a "fish-eye" semipanoramic view. The focal length of the combination is 0.11.

In a practical realization, the median focal length $f_{med}$ measured 19.134 mm. This corresponds to an overall focal length of 2.1 mm for the system illustrated in FIG. 4.

An attachment consisting of one or more lenses such as the one shown in FIG. 2, but of reduced power for better correction of aberrations, could be substituted for component 8‴ in FIG. 4. Such a lens could have, for example, a front radius $r_1 = +2.18$, a rear radius $r_2 = +1.25$, a thickness $d = 0.18$, a refractive index $n_d =$ 1.517 and an Abbé number $v_d = 62.2$. Its distance from lens $L_3'''$ may be $s_2''' = 0.40$.

Another varifocal objective to be used with any of the herein disclosed front attachments has the same structure as objective 1''' of FIG. 4 with the following parameters known per se from Austrian patent No. 325,325:

TABLE D

| | | | $n_d$ | $v_d$ |
|---|---|---|---|---|
| $L_3'''$ | $r_5''' = +5.279$ <br> $r_6''' = +1.670$ | $d_3''' = 0.084$ | 1.805 | 25.4 |
| $L_4'''$ | $r_7''' = +1.670$ <br> $r_8''' = \infty$ | $d_4''' = 0.276$ | 1.620 | 60.3 |
| | | $s_3''' = 0.004$ | | |
| $L_5'''$ | $r_9''' = +2.339$ <br> $r_{10}''' = +4.292$ | $d_5''' = 0.109$ | 1.658 | 5.9 |
| | | $s_4''' = 0.004$ | | |
| $L_6'''$ | $r_{11}''' = +1.597$ <br> $r_{12}''' = +7.433$ | $d_6''' = 0.213$ | 1.658 | 50.9 |
| | | $s_5''' = \begin{cases} 0.034\ f_{min} \\ 0.826\ f_{med} \\ 1.117\ f_{max} \end{cases}$ | | |
| $L_7'''$ | $r_{13}''' = +5.201$ <br> $r_{14}''' = +0.439$ | $d_7''' = 0.038$ | 1.691 | 54.7 |
| | | $s_6''' = 0.171$ | | |
| $L_8'''$ | $r_{15}''' = -0.749$ <br> $r_{16}''' = +0.638$ | $d_8''' = 0.038$ | 1.620 | 60.3 |
| $L_9'''$ | $r_{17}''' = +13.065$ | $d_9''' = 0.113$ | 1.805 | 25.4 |
| | | $s_7''' = \begin{cases} 1.173\ f_{min} \\ 0.224\ f_{med} \\ 0.089\ f_{max} \end{cases}$ | | |
| $L_{10}'''$ | $r_{18}''' = -0.727$ <br> $r_{19}''' = -1.845$ | $d_{10}''' = 0.042$ | 1.784 | 43.9 |
| | | $s_8''' = \begin{cases} 0.019\ f_{min} \\ 0.175\ f_{med} \\ 0.020\ f_{max} \end{cases}$ | | |
| $L_{11}'''$ | $r_{20}''' = +1.173$ <br> $r_{21}''' = -1.462$ | $d_{11}''' = 0.100$ | 1.691 | 54.7 |
| | | $s_9''' = 0.038$ | | |
| P | $r_{p1} = \infty$ <br> $r_{p2} = \infty$ | $d_p = 0.209$ | 1.517 | 64.2 |
| | | diaphragm space = 0.075 + 0.084 | | |
| $L_{12}'''$ | $r_{22}''' = +1.833$ <br> $r_{23}''' = -2.661$ | $d_{12}''' = 0.088$ | 1.744 | 44.8 |
| | | $s_{10}''' = 0.021$ | | |
| $L_{13}'''$ | $r_{24}''' = +0.620$ <br> $r_{25}''' = \infty$ | $d_{13}''' = 0.100$ | 1.744 | 44.8 |
| | | $s_{11}''' = 0.031$ | | |
| $L_{14}'''$ | $r_{26}''' = -0.826$ <br> $r_{27}''' = +0.481$ | $d_{14}''' = 0.292$ | 1.847 | 23.8 |
| | | $s_{12}''' = 0.050$ | | |
| $L_{15}'''$ | $r_{28}''' = +1.481$ <br> $r_{29}''' = -0.479$ | $d_{15}''' = 0.196$ | 1.735 | 41.6 |

This objective has a relative aperture of 1:1.8 and focal lengths $f_{max} = 2.232$, $f_{med} = 1.006$, $f_{min} = 0.301$.

In FIG. 5 we have shown lens mounts 9 and 10 for the shiftable members 3 and 4, these lens mounts being slidable along rods 11 and 12 paralleling the optical axis O of the objective. A cam disk 13, rotatable by a nonillustrated zoom-control member on a shaft 14 transverse to the axis, has two slots 15 and 16 in which pins 17 and 18 on lens mounts 9 and 10 are guided. Sections α of these slots serve for the adjustment of the focal length within the normal range as discussed above; the illustrated limiting position of disk 13 corresponds to the maximum focal length $f_{max}$. At the opposite end of the range the slots 15 and 16 are provided with extensions β by which the two components 3 and 4 are shifted away from each other in the macro range.

A lens holder 19, carrying the front attachment 8, is receivable in a socket 20 of a camera housing illustrated in part at 21. Upon such emplacement of holder 19, a shoulder 19a thereof bears upon a position sensor in the form of a pin 22 whose free end is urged into the socket 20 by a spring 25. Pin 22 forms part of a linkage 26 articulated to a detent 23 which has a fixed pivot at 23a and faces the periphery of cam disk 13. Unless a notch 24 in that periphery confronts the detent 23, pin 22 cannot be repressed and prevents the emplacement of holder 19 in the working position of attachment 8. Notch 24 is an indexing formation which registers with detent 23 only when the pins 17 and 18 engage the macro sections β of slots 15 and 16.

Figure 9:
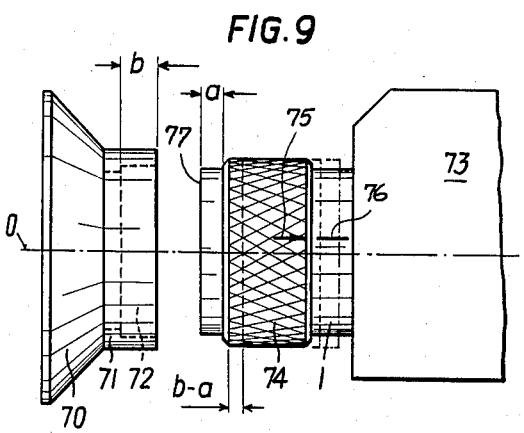
FIG. 9 is part of a side view similar to FIG. 6A, showing another modification.

As shown in FIG. 5A, detent 23 may be coupled with linkage 26 through another spring 27, weaker than spring 25, which allows the lens holder 19 to be operatively positioned whereby spring 27 is stressed to bias the detent toward the periphery of disk 13, causing it to fall into the notch 24 and to lock the disk 13 in the desired focusing position within the macro range. The objective in this case advantageously includes a visual indicator designed to alert the user to the fact that the objective is still out of focus, e.g. a view-finder of the focus-indicating type referred to above and served by a reflex prism to the rear of the shiftable lenses as shown in FIGS. 2 and 4. Such an indicator could also be a pair of marks 75, 76 on a control member 74 of the objective housing as shown in FIG. 9.

Figure 6A:
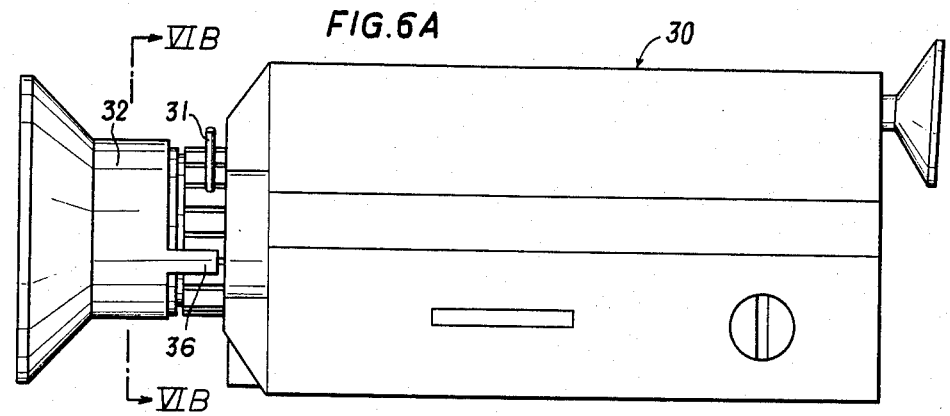
FIG. 6A is a side view of a camera equipped with another position sensor according to our invention.
Figure 6B:
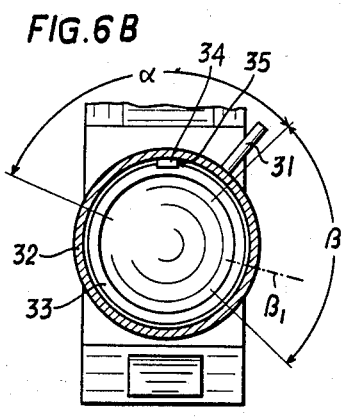
FIG. 6B is a cross-sectional view taken on the line VIB—VIB of FIG. 6A.

In FIGS. 6A and 6B we have illustrated a camera 30 with a setting lever 31 swingable about the objective axis for varying the focal length. The normal and macro ranges of the swing have again been designated α and β, respectively. A lens holder 32, carrying the wide-angle front attachment, has an extension 36 which projects into the path of lever 31 to stop it in the correct focusing position within the macro range as indicated at $β_1$. The correct angular alignment of holder 32 and camera 30 is insured by a key 34 on the holder engaging in a keyway 35 on the camera body.

Reference may be made to U.S. Pat. No. 3,613,544 for a description of a focusing mechanism using such a swingable control member.

Figure 7:
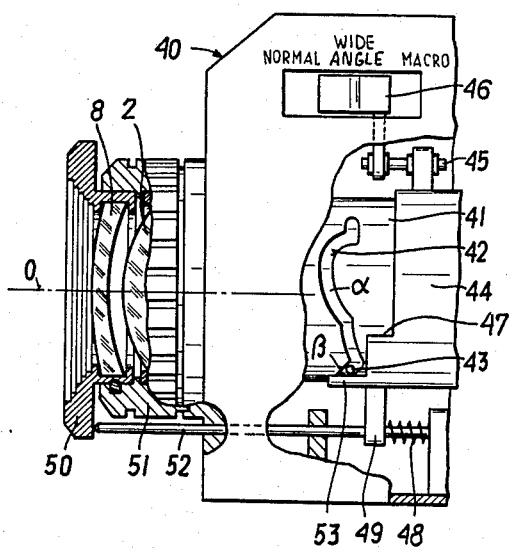
FIGS. 7 and 8 are views similar to FIG. 5, illustrating further types of position sensors.

In FIG. 7 we have shown a camera 40 provided with a fitting 51 for receiving an attachment 50 which carries a supplemental component 8. A rod 52 slidable in the camera housing is rigid with a lug 49 on a stepped sleeve 44 surrounding a lens barrel 41 with camming slots for the movable lens members, only a slot 42 controlling the second negative component 4 (FIG. 1) being visible. Slot 42 is again subdivided into a section α for the normal range and an extension β for the macro range. A mode-selector switch 46 is coupled with sleeve 44 in order to interpose a step 47 of this sleeve into the path of a pin 43 guided by slot 42 when that switch is in its left-hand position, thereby preventing an adjustment of the objective beyond the normal range. Upon insertion of attachment 8, 50, rod 52 is repressed against the force of a spring 48 so as to shift the sleeve 44 to the right, thereby enabling a continuing displacement pin 43 to be moved into a position within the macro range in which that pin comes to rest against another step 53 of sleeve 44. This axial shift of the sleeve entrains the mode-selector switch 46 into its midposition labeled "wide angle." The switch can also be manually moved into a right-hand position in which the step 53 is withdrawn from the path of pin 43 to enable free adjustment of the objective (in the absence of attachment 8, 50) within the macro range. A suitable latch, not shown, preferably arrests the sleeve in the last-mentioned position against the force of spring 48.

Figure 8:
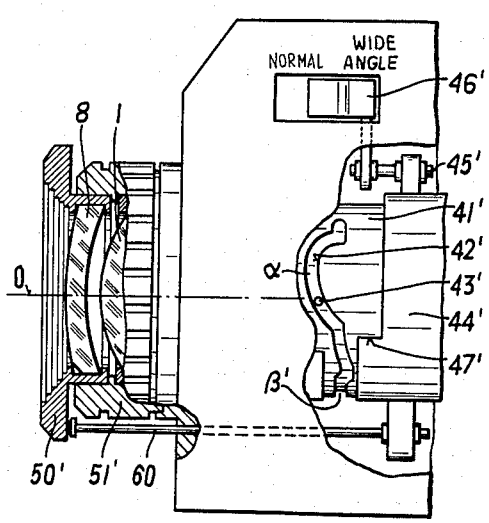

FIG. 8 shows an arrangement similar to that of FIG. 7 in which analogous elements have been designated by the same numerals with the addition of a prime mark ('). Switch 46' here has only its "normal" and "wide angle" positions, sleeve 44' being provided with only a single step 47'. A rod 60, replacing the spring-loaded rod 52 of FIG. 7, positively prevents the emplacement of lens holder 50' as long as the mode-selector switch 46' holds the sleeve 44' in its "normal" position in which the guide pin 43' for the axially shiftable lens 4 is prevented from entering the extension $\beta'$ of slot 42'. Thus, the user must first adjust the switch 46' to "wide angle" before being able to fit the holder 50' to the camera. It should be noted that slot section $\beta'$ lies in a plane transverse to the axis so as to define the desired focusing position no matter how far the pin 43' is moved past the junction of slot sections $\alpha$ and $\beta'$.

A lens holder 70 shown in FIG. 9 has a flange 71 with an internal recess 72 fitting onto a neck 77 of a lens mount rigid with a camera 73, this neck carrying the aforementioned control member 74 in the form of a ring which can be rotated for adjustment of the focal length and axially slid for the shifting of an objective component in the macro range. A non-illustrated spring biases the control ring 74 into the position shown in full lines in which normal-range adjustment by rotation is possible; the ring can be slid to the right, into its dotted-line position, only upon alignment of the two marks 75, 76. The width $a$ of the free end of neck 77 is less than the depth $b$ of recess 72 whereby the ring 74 is automatically shifted into the proper focusing position if the marks 75 and 76 register with each other. If not, the lens holder 70 cannot be emplaced. Naturally, this lens holder must be able to engage the neck 77 with sufficient friction to resist the force of the aforementioned spring unless suitable retaining means such as a bayonet coupling are provided therefor.

The various correlating linkages described above could also be used to indicate or bring about the movement of an additional lens from an off-axial position into line with the normal components of the varifocal objective, in order to establish the desired macro position, or to prevent the fitting of a wide-angle attachment to the objective housing as long as that additional lens is withdrawn.

We claim:

1. In a camera including a housing, a varifocal objective in said housing provided with movable lens means and with a control element for displacing said movable lens means from a normal operating range into a macro position, and supplemental lens means emplaceable on a seat formed by said housing in line with said objective for focusing same on nearby objects in a closeup range upon displacement of said movable lens means into said macro position,
the combination therewith of blocking means normally extending into the path of said control element for preventing the displacement of said movable lens means into said macro position, and a contact member on said housing coupled with said blocking means and engageable by said supplemental lens means upon emplacement thereof on said seat for removing said blocking means from the path of said control element.

2. The combination defined in claim 1 wherein said housing includes a lens barrel provided with a peripheral camming slot, said control element being a pin traversing said camming slot, said blocking means comprising a sleeve axially movable along said lens barrel, said sleeve having an edge extending across said camming slot in a normal axial position thereof.

3. The combination defined in claim 2, further comprising spring means urging said sleeve into said normal axial position, said contact member being a rod axially projecting from said sleeve toward said seat.

4. In a camera including a housing, a varifocal objective in said housing provided with movable lens means and with a control element for displacing said movable lens means from a normal operating range into a macro position, and supplemental lens means emplaceable on a seat formed by said housing in line with said objective for focusing same on nearby objects in a closeup range upon displacement of said movable lens means into said macro position,
the combination therewith of a contact member on said housing engageable by said supplemental lens means upon emplacement thereof on said seat for displacement toward said control element to arrest the latter in a position of adjustment corresponding to said macro position of said movable lens means, said contact member being provided with a resiliently biased extension bearing on said control element upon such displacement by said supplemental lens means, said control element having an indexing formation coacting with said extension in said position of adjustment.

5. The combination defined in claim 4 wherein said control element comprises a cam disk provided with a peripheral notch constituting said indexing formation.

6. The combination defined in claim 4 wherein said contact member is part of an articulated linkage.

7. In a camera including a housing, a lens barrel in said housing centered on an optical axis and provided with at least one peripheral camming slot, a varifocal objective in said hosuing including axially movable lens means, control means for displacing said movable lens means to vary the focal length of said objective, said control means including a pin traversing said camming slot, and supplemental lens means emplaceable on a seat formed by said housing in line with said objective for focusing same on nearby objects in a closeup range upon displacement of said pin into an extension of said camming slot with entrainment of said movable lens means into a macro position,
the combination therewith of a sleeve axially movable along said lens barrel, said sleeve having an edge extending in a normal axial position thereof across said camming slot for blocking the movement of said pin into said extension, and a contact member rigid with said sleeve extending into said seat in said normal axial position for preventing the emplacement of said supplemental lens means until the removal of said sleeve to an alternate position enabling the establishment of said macro position.

8. The combination defined in claim 7 wherein said contact member is a rod axially projecting from said sleeve toward said seat.

* * * * *